United States Patent
Li et al.

(10) Patent No.: US 12,393,404 B2
(45) Date of Patent: Aug. 19, 2025

(54) SAMPLE-DIFFERENCE-BASED METHOD AND SYSTEM FOR INTERPRETING DEEP-LEARNING MODEL FOR CODE CLASSIFICATION

(71) Applicant: Huazhong University of Science and Technology, Wuhan (CN)

(72) Inventors: Zhen Li, Wuhan (CN); Ruqian Zhang, Wuhan (CN); Deqing Zou, Wuhan (CN); Hai Jin, Wuhan (CN); Yangrui Li, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 169 days.

(21) Appl. No.: 18/475,447

(22) Filed: Sep. 27, 2023

(65) Prior Publication Data
US 2024/0192929 A1   Jun. 13, 2024

(30) Foreign Application Priority Data
Dec. 9, 2022   (CN) .......................... 202211612114.2

(51) Int. Cl.
G06F 8/35   (2018.01)
G06F 8/41   (2018.01)

(52) U.S. Cl.
CPC . *G06F 8/35* (2013.01); *G06F 8/42* (2013.01)

(58) Field of Classification Search
CPC .................................. G06F 8/35; G06F 8/42
See application file for complete search history.

(56) References Cited

U.S. PATENT DOCUMENTS 11,087,184 B2 *   8/2021   Min ..................... G06V 10/764
11,126,720 B2 *   9/2021   Miserendino .......... G06N 5/025
(Continued)

FOREIGN PATENT DOCUMENTS

CN   112270358 A       1/2021
CN   112651467 A   *   4/2021   ........... G06F 18/214
(Continued)

OTHER PUBLICATIONS

Li, Zhen, et al. "Robin: a novel method to produce robust interpreters for deep learning-based code classifiers." 2023 38th IEEE/ACM International Conference on Automated Software Engineering (ASE). IEEE, 2023.*

(Continued)

*Primary Examiner* — Francisco J Aponte
(74) *Attorney, Agent, or Firm* — Smart & Biggar LP

(57) ABSTRACT

A sample-difference-based method and system for interpreting a deep-learning model for code classification is provided, wherein the method includes a step of off-line training an interpreter: constructing code transformation for every code sample in a training set to generate difference samples; generating difference samples respectively through feature deletion and code snippets extraction and then calculating feature importance scores accordingly; and inputting the original code samples, the difference samples and the feature importance scores into a neural network to get a trained interpreter; and a step of on-line interpreting the code samples: using the trained interpreter to extract important features from the snippets, then using an influence-function-based method to identify training samples that are most contributive to prediction, comparing the obtained important features and the most contributive training samples, and generating interpretation results for the object samples. The (Continued)

inventive system includes an off-line training module and an on-line interpretation module.

8 Claims, 4 Drawing Sheets

(56) References Cited

U.S. PATENT DOCUMENTS

| | | | | |
|---|---|---|---|---|
| 11,842,159 | B1* | 12/2023 | Kumar | G06F 40/284 |
| 12,107,872 | B2* | 10/2024 | Neupane | G06N 3/04 |
| 12,189,716 | B1* | 1/2025 | Liao | G06F 18/217 |
| 12,254,388 | B2* | 3/2025 | McGrath | G06N 5/045 |
| 12,277,409 | B1* | 4/2025 | Leeman-Munk | G06F 8/35 |
| 2015/0220853 | A1* | 8/2015 | Marcheret | G06N 20/00 706/12 |
| 2019/0273509 | A1* | 9/2019 | Elkind | H03M 7/4093 |
| 2020/0082282 | A1* | 3/2020 | Simpson | G06N 3/045 |
| 2020/0218939 | A1* | 7/2020 | Mansour | G06N 20/00 |
| 2020/0279192 | A1* | 9/2020 | Godfrey | G06F 18/2415 |
| 2021/0158075 | A1* | 5/2021 | Shoshan | G06V 10/774 |
| 2021/0240826 | A1 | 8/2021 | Kutt | |
| 2022/0027749 | A1* | 1/2022 | Bigaj | G06N 5/04 |
| 2023/0031691 | A1* | 2/2023 | Carroll | G06N 3/045 |
| 2023/0274533 | A1* | 8/2023 | Isobe | G06V 10/774 382/157 |
| 2023/0326191 | A1* | 10/2023 | Li | G06N 3/096 382/155 |
| 2024/0378399 | A1* | 11/2024 | Gandhi | G06F 16/345 |

FOREIGN PATENT DOCUMENTS

| | | |
|---|---|---|
| CN | 112989358 A | 6/2021 |
| CN | 114021718 A | 2/2022 |
| CN | 114170333 A | 3/2022 |
| CN | 114692621 A | 7/2022 |
| CN | 114745205 A | 7/2022 |
| CN | 115438743 A | 12/2022 |
| WO | 2020039075 W | 2/2020 |

OTHER PUBLICATIONS

Sun, Xiaofei, et al. "Interpreting deep learning models in natural language processing: A review." (2021).*

Sharma, Arushi, et al. "Redundancy and Concept Analysis for Code-trained Language Models." Proceedings of the 39th IEEE/ACM International Conference on Automated Software Engineering Workshops 2024.*

Reed, Scott, and Nando De Freitas. "Neural programmer-interpreters." (2015).*

Deqing Zou, Yawei Zhu, Shouhuai Xu, Zhen Li, Hai Jin, and Hengkai Ye. 2021. Interpreting deep learning-based vulnerability detector Mar. 2021.

Md Rafiqul Islam Rabin, Vincent J Hellendoorn, and Mohammad Amin Alipour. 2021. Understanding neural code intelligence through program simplification Aug. 23, 2021.

Bui, Nghi D.Q. et al. "AutoFocus: Interpreting Attention-based Neural Networks by Code Perturbation". The 34th IEEE/ACM International Conference (ASE 2019), Nov. 15, 2019, San Diego, CA, USA 2019.

Sahil Suneja, Yunhui Zheng, Yufan Zhuang, Jim A Laredo, and Alessandro Morari. 2021. Probing model signal-awareness via prediction-preserving input minimization 2021.

Hagawa, et al. "Multi-staged deep learning with created coarse and appended fine categories". 2015 3rd IAPR Asian Conference on Pattern Recognition (ACPR).

* cited by examiner

SAMPLE-DIFFERENCE-BASED METHOD AND SYSTEM FOR INTERPRETING DEEP-LEARNING MODEL FOR CODE CLASSIFICATION

CROSS-REFERENCE TO RELATED APPLICATION

This application claims the benefits of priority to Chinese Patent Application No. 202211612114.2, filed Dec. 9, 2022, the contents of which are hereby expressly incorporated by reference into the DETAILED DESCRIPTION OF THE APPLICATION below in their entirety.

BACKGROUND OF THE APPLICATION

1. Technical Field

The present disclosure generally relates to interpretation of deep-learning models, in particular interpretation based on feature selection, and more particularly to a sample-difference-based method and system for interpretation of a deep-learning model for code classification.

2. Description of Related Art

In the past few years, different types of neural networks have been integrated into code applications, such as code function classification, code authorship attribution, vulnerability detection for source codes, etc. While deep learning is more capable than human in these tasks, questions about its lacking for interpretability in terms of performance and applications remain unaddressed. For ordinary users, machine learning, particularly the technology of deep neural networks, is regarded black-box as it does not offer any insights on the input features that they learn for forming correct predictions. This opacity may lead to distrust in its prediction and hamper its wider adoption in safety-critical applications.

Existing methods for interpretation of source code classification models can mainly be divided into perturbation-based feature saliency methods, attention-based methods, and methods based on program reduction. The following non-patent documents are cited herein as references of the present application:

Reference 1: Deqing Zou, Yawei Zhu, Shouhuai Xu, Zhen Li, Hai Jin, and Hengkai Ye. 2021. Interpreting deep learning-based vulnerability detector predictions based on heuristic searching. ACM Transactions on Software Engineering and Methodology (TOSEM) 30, 2 (2021), 1-31;

Reference 2: Nghi D Q Bui, Yijun Yu, and Lingxiao Jiang. 2019. Autofocus: interpreting attention-based neural networks by code perturbation. In 2019 34th IEEE/ACM International Conference on Automated Software Engineering (ASE). IEEE, 38-41;

Reference 3: Sahil Suneja, Yunhui Zheng, Yufan Zhuang, Jim A Laredo, and Alessandro Morari. 2021. Probing model signal-awareness via prediction-preserving input minimization. In Proceedings of the 29th ACM Joint Meeting on European Software Engineering Conference and Symposium on the Foundations of Software Engineering. 945-955; and Reference 4: Md Rafiqul Islam Rabin, Vincent J Hellendoorn, and Mohammad Amin Alipour. 2021. Understanding neural code intelligence through program simplification. In Proceedings of the 29th ACM Joint Meeting on European Software Engineering Conference and Symposium on the Foundations of Software Engineering. 441-452.

Among these references, Reference 1 discloses a feature saliency method based on perturbation. The perturbation-based method involves perturbating features in code samples and observing variations in prediction values to acquire importance scores of the features. Reference 2 discloses a method based on attention. The attention-based method takes attention scores in a neural network as importance scores of features. References 3 and 4 disclose methods based on program reduction. These methods use delta debugging to minimize programs to minimal sentence sets while maintaining the initial model prediction.

Nevertheless, these known methods have their respective limits.

First, perturbation can cause inputs to be located outside the distribution of the training set. Both perturbation-based feature saliency method and attention-based methods use perturbation for evaluation of feature importance. The concept is that masking features of inputs important to prediction can significantly decrease prediction accuracy. However, feature perturbation brings about inputs outside the distribution, forming it difficult to tell whether the degraded accuracy is caused by information deletion or out-of-distribution inputs.

Another issue is vulnerability. As to local interpretation, like that implemented in perturbation-based feature saliency methods and program-reduction-based methods, since interpretation of prediction for every input sample is optimized independently, noise in individual input sample tends to be overfitted. As a result, even a minor change in an input sample can lead to significant variation of its interpretation result. On the other hand, global interpretation often tries to interpretate the global decision-forming logic of a model by approaching decision-forming behavior. However, such an approaching process is often not accurate enough, and the inconformity between the interpreter and the decision-forming model provides an opportunity for attackers.

Since there is certainly discrepancy between the existing art comprehended by the applicant of this patent application and that known by the patent examiners and since there are many details and disclosures disclosed in literatures and patent documents that have been referred by the applicant during creation of the present disclosure not exhaustively recited here, it is to be noted that the present disclosure shall actually include technical features of all of these existing works, and the applicant reserves the right to supplement the application with the related art more existing technical features as support according to relevant regulations.

SUMMARY OF THE APPLICATION

In view of the shortcoming of the existing art, and with the consideration that adversarial training and ensemble training significantly improve robustness of deep-learning models, the present disclosure provides a sample-difference-based method for interpreting a deep-learning model for code classification and a system thereof, with the attempt to provide a general high-fidelity interpretation method that is specific to deep-learning models for code classification and significantly improves robustness of interpretation, thereby addressing the restriction and shortcomings of the existing methods for interpretation of code classification model.

The present application discloses a sample-difference-based method for interpreting a deep-learning model for code classification, comprising the following steps:

(1) a step of off-line training an interpreter: constructing code transformation for every code sample in a training set to generate difference samples; generating difference samples through feature deletion and then calculating feature importance scores; generating difference samples through extracting code snippets and then calculating feature importance scores; and inputting the original code samples, the difference samples and the feature importance scores into a neural network for training the interpreter, so as to get a trained interpreter; and (2) a step of on-line interpreting the code samples: using the trained interpreter to extract important features from snippets of the object code samples, then using an influence-function-based method to identify training samples in the training set that are most contributive to prediction for the individual tested samples, comparing the obtained important features and the most contributive training samples, and at last generating interpretation results for the object samples.

The present disclosure eliminates the need of dependency on expert knowledge by employing a deep-learning model for automatic selection of features, and is generally applicable to various code classification models. It uses approximators having the same model structure as the original classification model to assist in training the interpreter and evaluating the interpretation result. This mitigates the problem that inputs introduced by perturbation samples are outside the distribution of the training set, and thereby improves fidelity of the interpretation result. Meanwhile, as stability is calculated by constructing code transformation to generate difference samples, and similarity is calculated by deleting features and forming snippets to acquire feature importance scores, stability and similarity are incorporated in the training of the interpreter, thereby improving robustness of the interpreter.

According to a preferred implementation, the step (1) comprises the following sub-steps:

constructing code transformation to generate difference samples: for the input code samples, scanning all code transformation points that meet transformation requirements, generating a plurality of transformation vectors of corresponding dimensions, conducting the code transformation with the generated transformation vectors, screening the generated difference samples, and deleting the samples that do not meet expectations so as to get a difference sample set.

According to a preferred implementation, the step (1) comprises the following sub-steps:

deleting the features and calculating the feature importance scores: deleting all of the features in the code samples, respectively, to generate the difference samples, so that the number of the generated difference samples is equal to the number of the features; inputting the difference samples into the model to be interpreted for prediction, and generating the importance scores of the corresponding features according to variation of a prediction value caused by deletion of the features.

According to a preferred implementation, the step (1) comprises the following sub-steps:

forming the snippets and calculating the feature importance scores: for the code samples, defining each of the features as a snipping point, and extracting the features between the first feature of the sample and the snipping point, so as to get the code snippets, tail-padding each the code snippets with zeros to generate the vectors of an identical length, inputting the vectors into the model to be interpreted for the prediction, generating the importance scores of the corresponding features according to variation of prediction value caused by movement of the snipping points.

According to a preferred implementation, the step (1) comprises the following sub-steps:

training robust interpreter: constructing a deep neural network framework for the interpreter and two approximators, defining a loss function, then fixing the two approximators and training the interpreter, then fixing the interpreter and training the two approximators, and circularly iterating the training until loss convergence, so as to eventually obtain the trained interpreter.

According to a preferred implementation, the framework of the interpreter and two approximators is such designed that the approximators having a structure that is identical to a structure of the original model to be interpreted, and that the interpreter has a model structure determined by format of input data, wherein if the data are input as sequences, the interpreter is designed as a Recurrent Neural Network (RNN); or if the data are input as abstract syntax trees (ASTs), the interpreter is designed as an AST-based Convolutional Neural Network (CNN).

According to a preferred implementation, the step (2) comprises the following sub-steps:

extracting the important features from the object code samples: inputting the vectors of the object code samples into the trained interpreter to acquire a feature importance score vector, and extracting features with relatively high importance scores, so as to obtain the important features of the object code samples;

identifying the training samples that are most contributive to prediction for the object code samples: calculating an effect of removal of each of the training samples on loss of prediction according to the influence function, thereby identifying the training samples that are most contributive to prediction for the object code samples; and integrating the important features and the training sample to generate the interpretation result, wherein the interpretation result is visualizable.

The present application discloses a sample-difference-based system for interpreting a deep-learning model for code classification, which has a processor comprising:

an off-line training module, used for: constructing code transformation for every code sample in a training set to generate difference samples; generating difference samples through feature deletion and then calculating feature importance scores; generating difference samples through extracting code snippets and then calculating feature importance scores; and inputting the original code samples, the difference samples and the feature importance scores into a neural network for training the interpreter, so as to get a trained interpreter; and an on-line interpretation module, used for: using the trained interpreter to extract important features from snippets of the object code samples, then using an influence-function-based method to identify training samples in the training set that are most contributive to prediction for the individual tested samples, comparing the obtained important features to the most contributive training samples, and at last generating interpretation results for the object samples.

According to a preferred implementation, the off-line training module comprises:

a code transformation and difference generation submodule, used for: constructing code transformation for training samples to generate difference samples, performing code transformation without changing any tag for each of the training samples, screening the generated difference samples, deleting the samples whose prediction types have been changed, and generating a code transformation difference sample set;

a feature deletion and score generation sub-module, used for: by means of deleting the features from the code samples in the training set, observing variation in the prediction value caused by the deletion, so as to acquire the importance scores of the features;

a snippet extraction and score generation sub-module, used for: by means of forming snippets of the code samples in the training set, observing differences among the prediction values of different snippets, so as to acquire the importance scores of the features; and a model training sub-module, used for: inputting the code samples from the training set, the difference samples, the feature importance scores and tags of the code samples from the training set into a neural network model for training, adjusting various parameters to acquire the trained interpreter, thereby extracting the important features from the code samples.

According to a preferred implementation, the on-line interpretation module comprises:

an important feature extracting sub-module, used for: transforming the object code samples into the vector as required by the model to be interpreted and inputting the vectors into the trained interpreter to acquire the feature importance scores, and extracting the features having the relatively high importance scores so as to acquire the important features of the object code samples;

a training-sample identifying sub-module, for calculating the influence function, figuring out an effect of removal of each of the training samples on loss of prediction for the object code samples, identifying the training sample having the greatest effect on the prediction for the object code samples according to the influence function; and a result generating sub-module, used for: integrating the important features extracted from the object code samples and the most contributive training samples to generate the interpretation result that is visualizable, thereby enhancing understandability of the interpretation result.

DETAILED DESCRIPTION OF THE APPLICATION

The present disclosure will be further detailed below with reference to accompanying drawings and particular embodiments.

To interpreting the objectives, technical schemes and benefits of the present disclosure, particular embodiments as well as accompanying drawings are provided herein. It is to be understood that these embodiments are only illustrative but not limiting. Moreover, the technical features referred to in the embodiments of the present disclosure may be combined with each other in any manner as long as no conflicts are caused therebetween.

Figure 1:
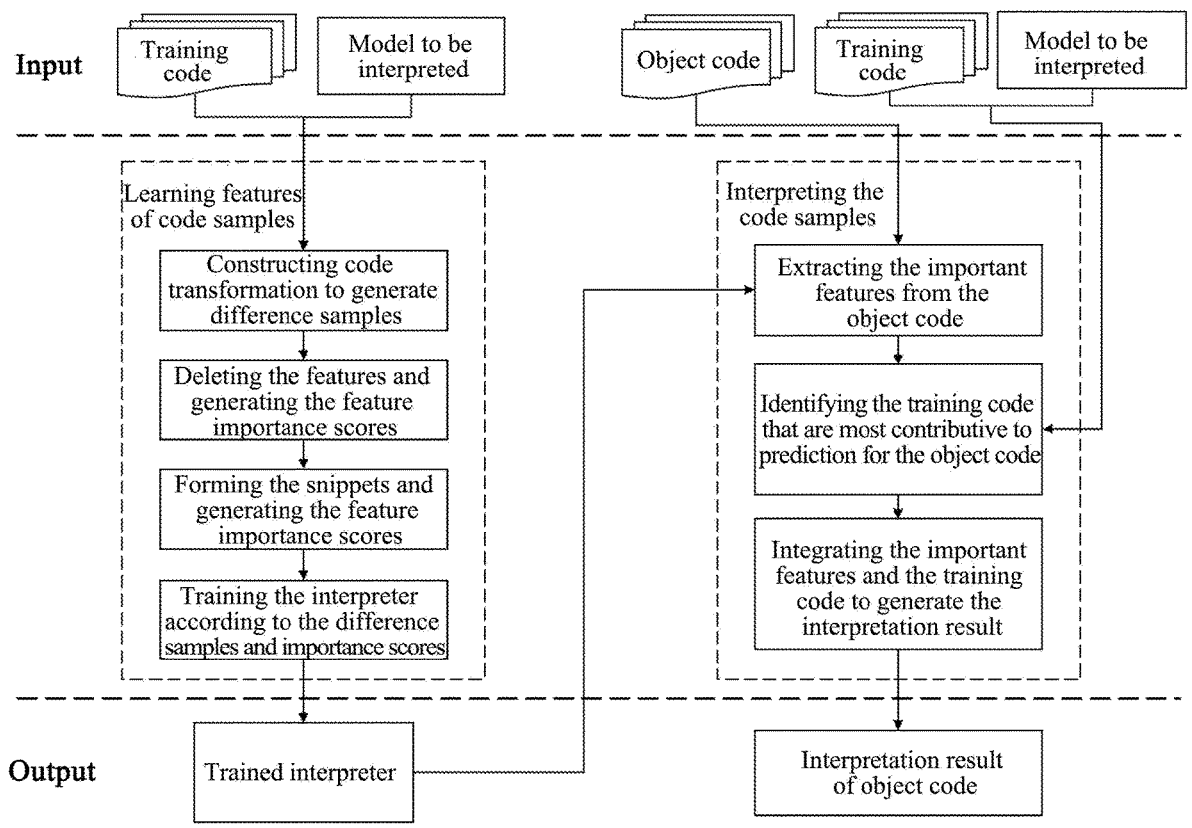
FIG. 1 is a flowchart of a sample-difference-based method for interpreting a deep-learning model for code classification according to one embodiment of the present disclosure.

According to a preferred implementation, the present application discloses a sample-difference-based method for interpreting a deep-learning model for code classification, which comprises the following steps as also shown in FIG. 1:

(1) a step of off-line training an interpreter: constructing code transformation for every code sample in a training set to generate difference samples; generating difference samples through feature deletion and then calculating feature importance scores; generating difference samples through extracting code snippets and then calculating feature importance scores; and inputting the original code samples, the difference samples and the feature importance scores into a neural network for training the interpreter, so as to get a trained interpreter; and (2) a step of on-line interpreting the code samples: using the trained interpreter to extract important features from snippets of the object code samples, then using an influence-function-based method to identify a training sample in the training set that contributes most, comparing the obtained important features and the most contributive training samples, and at last generating interpretation results for the object samples.

The present disclosure eliminates the need of dependency on expert knowledge by employing a deep-learning model for automatic selection of features, and is generally applicable to various code classification models. It uses approximators having the same model structure as the original classification model to assist in training the interpreter and evaluating the interpretation result. This mitigates the problem that inputs introduced by perturbation samples are outside the distribution of the training set, and thereby improves fidelity of the interpretation result. Meanwhile, as stability is calculated by constructing code transformation to generate difference samples, and similarity is calculated by deleting features and forming snippets to acquire feature importance scores, stability and similarity are incorporated in the training of the interpreter, thereby improving robustness of the interpreter.

An example of servers suitable for implementing the present disclosure is one modeled Dell Precision 7920 Tower, which uses Intel® Xeon® Gold 6226R CPU @ 2.90 GHz as its CPU and RTX A6000 as its GPU, and has its memory sized 256 GB DDR4 RAM, and a storage capacity of 1 TB SSD+8 TB HDD.

Generally, the present disclosure is used for deep-learning models for code classification during the piloting stage before the models are deployed in servers and rolled out for extensive use and during the use stage after the models have been adopted by extensive uses in order to provide code-classification providers and user of code-classification services with reference for classification of the models. A particular use case is described below.

When running debugging tests for a trained code classification model, such as one for vulnerability detection, function classification or authorship attribution, before its rollout, a service provider for code classification may use the disclosed method to mark important features of tested code samples and identify the most relevant training samples to help with determination of reasons causing wrong model prediction and verification of whether there is any bias in model prediction. Taking detection of code vulnerability for example, a provider can use the disclosed method to extract important features from the wrongly classified code samples and identify the training samples contributed most to this wrong prediction. Then the reason leading to errors in the classification model can be identified by analyzing the features and the training samples. The reasons may be wrongly-tagged training samples in the training set or bias caused when the model made prediction using irrelevant information such as file names or variable names. The service provider can then take actions on the causes of faults to improve the classification model.

When a user uses a code classification tool to classify codes, the disclosed method can tag for the user both the important features in input code sample and the training sample that contributes most to the prediction, thereby justifying the classification results and increasing the user's confidence to the prediction results. Taking code vulnerability detection for example again, the user uses the disclosed method to extract important features from input code samples and training samples contributing most to sample classification. By comparing differences between the input samples and the training samples and performing meta-analysis on the important features, potential vulnerability can be located, so the user can manually analyze codes at the suspected location and recognize the vulnerability types, so that the user can better understand the ground on which the classification tool made classification and be more confident of the classification results produced by the classification tool.

The data processed by the processor using the present disclosure may be files capable of storing text sequences of source codes like texts (.txt) or source codes (.c\.cpp\.py\.java) and files capable of storing deep-learning models like hierarchical data (.h5\.h5df). At the back end of the server, a data reading unit is constructed (mainly realized using the Python programming language) to achieve inter-system communication through API interface of platforms, so as to realize mutual collection of the foregoing data. The network protocol used in the application layer is HTTPS, which is more capable of protecting data security and user privacy than HTTP. On this basis, the data reading unit receives the files in the foregoing formats through the interface and reads text sequences of source codes and source code classification deep-learning models from the file. The read data are then processed and standardized before delivered to the processor in the server for further use.

Preferably, the step (1) may specifically include the following steps:

(1.1) performing code transformation to generate difference samples: for the input code samples, scanning all code transformation points that meet transformation requirements, generating a plurality of transformation vectors of corresponding dimensions, conducting the code transformation with the generated transformation vectors, then screening the generated difference samples, and deleting the samples that do not meet expectations so as to get a difference sample set.

Particularly, to generate the transformation vectors, several vectors mutually unequal are generated from random numbers. Therein, the dimension of the vectors is equal to the number of the code transformation point as scanned in the step (1.1), which is 1 or 0.

Particularly, to perform code transformation of the generated transformation vectors, for the input code samples, every dimension of the transformation vectors corresponds to one code transformation point in the code samples. If some dimension has a value of 1, this indicates that transformation shall be performed at the code transformation point corresponding to the dimension; otherwise no transformation shall be performed.

To screen the generated difference samples, the difference samples generated through code transformation are input into the model to be interpreted for prediction. The prediction tags are compares with the tags of the untransformed original samples to see whether they are identical. The difference samples having their prediction types and tags unchanged after transformation are preserved and the difference samples having their prediction types and tags changed after transformation are deleted.

Figure 2:
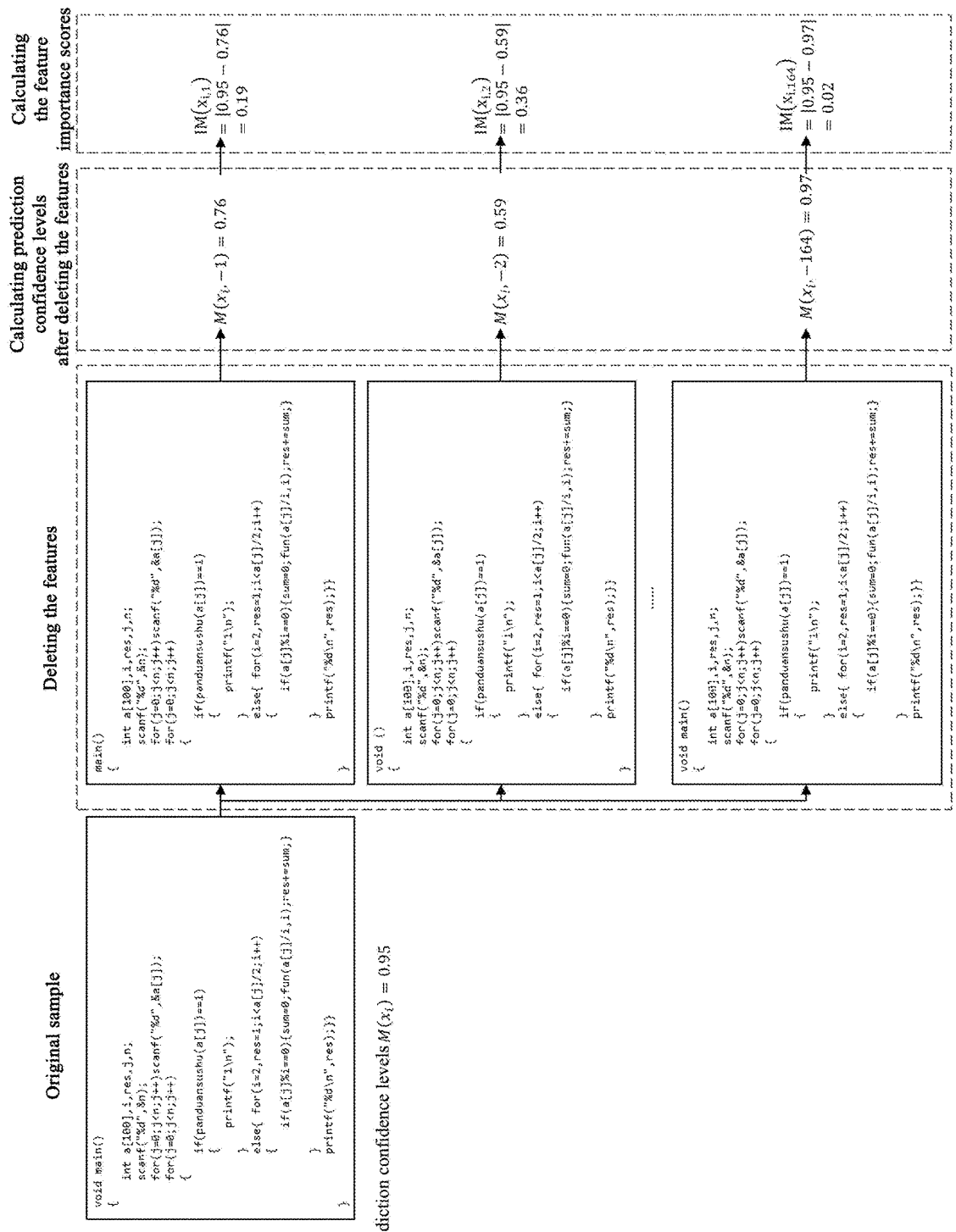
FIG. 2 is a flowchart of calculation of feature importance scores through deleting features according to an embodiment of the present disclosure.

(1.2) deleting the features and calculating the feature importance scores, referring to FIG. 2: deleting all of the features in the code samples, respectively, to generate the difference samples, so that the number of the generated difference samples is equal to the number of the features; inputting the difference samples into the model to be interpreted for prediction, and generating the importance scores of the corresponding features according to variation of a prediction value caused by deletion of the features.

To figure out the feature importance scores, the samples before and after feature deletion are input into the model to be interpreted to acquire the prediction confidence levels corresponding to the tags. Then the difference between the confidence levels of two samples are calculated as the importance score corresponding to the deleted feature.

Figure 3:
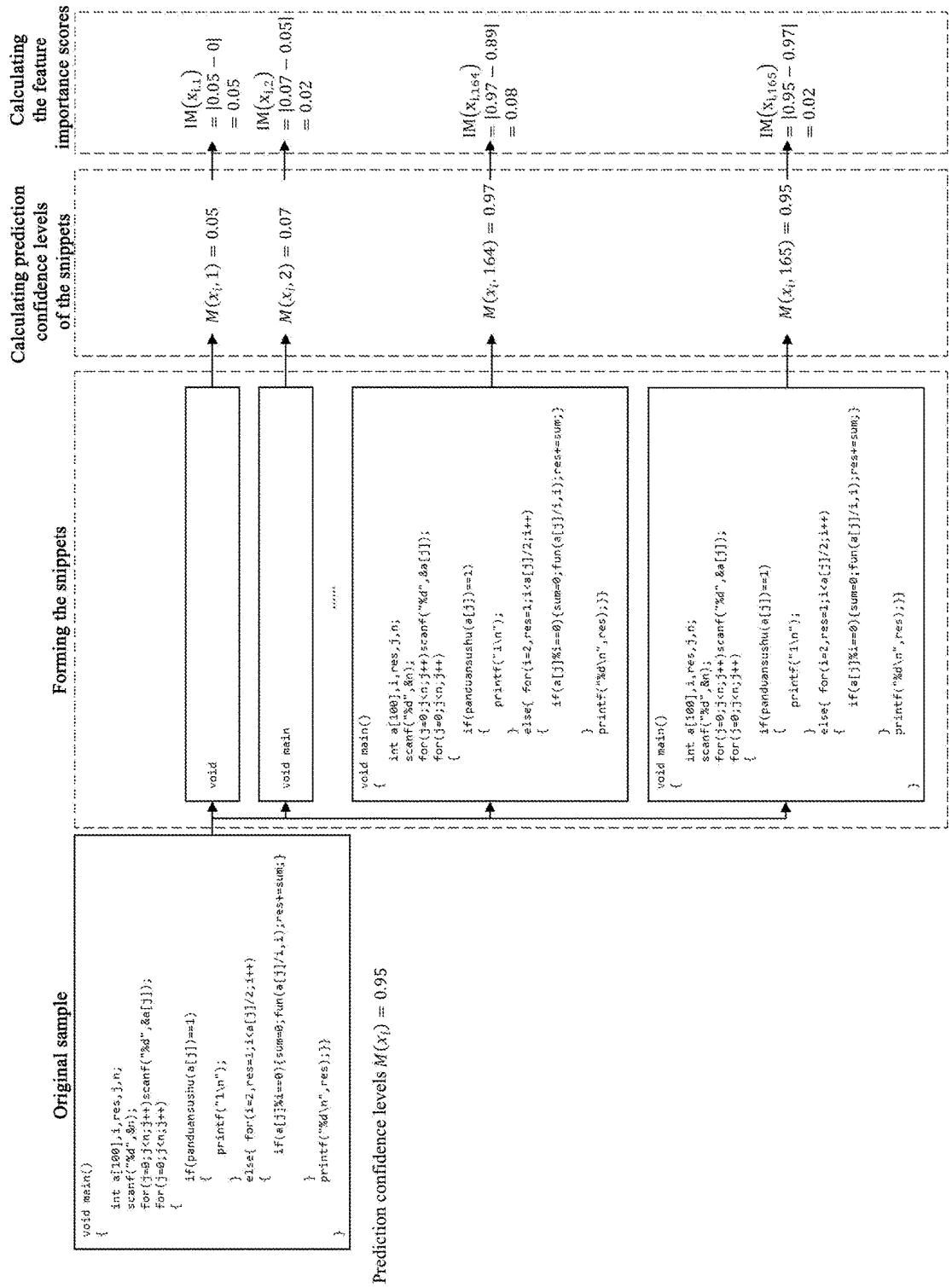
FIG. 3 is a flowchart of calculation of feature importance scores through forming snippets according to an embodiment of the present disclosure.

(1.3) forming the snippets and calculating the feature importance scores, referring to FIG. 3: for the code samples, defining each of the features as a snipping point, and extracting the features between the first feature of the sample and the snipping point, so as to get the code snippets, tail-padding each the code snippets with zeros to generate the vectors of an identical length, inputting the vectors into the model to be interpreted for the prediction, generating the importance scores of the corresponding features according to variation of prediction value caused by movement of the snipping points.

To figure out the feature importance scores, the code snippet made using the feature immediately before the feature to be calculated as its snipping point and the code snippet made using the feature to be calculated as its snipping point are input into the model to be interpreted to acquire the prediction confidence levels corresponding to the tags. Then the difference between the confidence levels of two samples are calculated as the importance score of the feature to be calculated.

Figure 4:
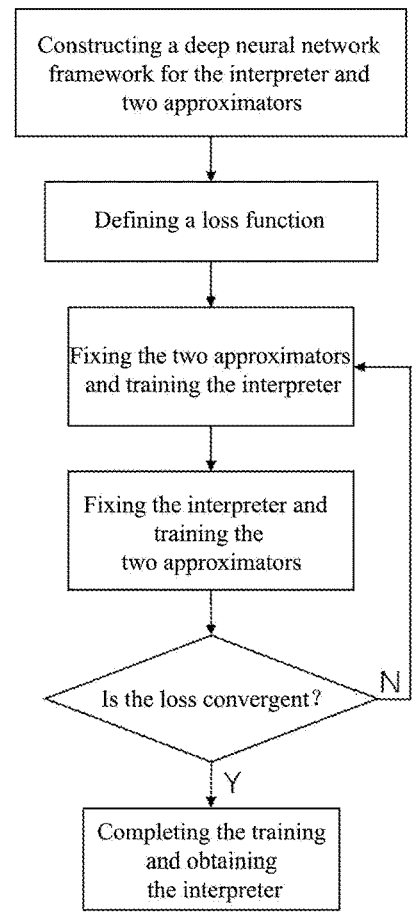
FIG. 4 is a flowchart of interpreter training according to an embodiment of the present disclosure.

(1.4) Training robust interpreter, referring to FIG. 4: constructing a deep neural network framework for the interpreter and two approximators, defining a loss function, then fixing the two approximators and training the interpreter, then fixing the interpreter and training the two approximators, and circularly iterating the training until loss convergence, so as to eventually obtain the trained interpreter.

The framework of the interpreter and two approximators is such designed that the approximators having a structure that is identical to a structure of the original model to be interpreted, and that the interpreter has a model structure determined by format of input data, wherein if the data are input as sequences, the interpreter is designed as a Recurrent Neural Network; or if the data are input as abstract syntax trees (ASTs), the interpreter is designed as an AST-based Convolutional Neural Network.

As to inputs and outputs of the interpreter and the two approximators, the input to the interpreter is code samples, and the output of the interpreter is feature importance vectors in the code samples. According to the feature importance vectors, important feature masks are generated. The input to the approximator A is the product of the important feature mask and the original input vector, i.e., the selected important feature. The output of the approximator A is the type of prediction made to the code sample by the model to be interpreted. The input to the approximator B is the product of the inverse of the important feature mask in the code sample and the original input vector, i.e., the non-selected, non-important feature. The output of the approximator B is the type of prediction made to the code sample by the model to be interpreted.

To design the loss function, the difference samples generated in the step (1.1) are used to calculate stability, and the feature importance score generated in the step (1.2) and the step (1.3) are used to calculate similarity. In the process of fixing the approximators and training the interpreter, the loss function is defined as the difference between the loss of the approximator A and the loss of the approximator B. In the process of fixing the interpreter and training approximator, the loss function is obtained by subtracting the stability and the similarity from the sum of the loss of the approximator A and the loss of the approximator B, wherein the exact values of parameters are adapted to the current task so as to achieve the optimal training result.

According to the loss function, the stability is such defined that the stability at which the interpreter E generates the difference sample set $X_i^a$ with respect to individual input samples is represented as $ST(X_i^a)$, and calculated using the following equation:

$$ST(X_i) = \sum_{x_i, x_j \in X_i} \frac{\text{card } (E(x_i) \cap E(x_j))}{|M_{y_i}(x_i) - M_{y_i}(x_j)|}$$

where $x_i$ and $x_j$ are any two samples in the difference sample set $X_i^a$, and $E(x_i)$ and $E(x_j)$ are important features in $x_i$ and $x_j$ extracted by the interpreter E, while card $(E(x_i) \cap E(x_j))$ is for getting the intersection between the two sets of important features and counting the number of elements in the intersection, and $|M_{y_i}(X_i) - M_{y_i}(X_j)|$ is for calculating the difference between the confidence levels the model to be interpreted having for prediction for the two samples. By dividing the number of elements in the intersection into the difference of the confidence levels, a normalized size of the intersection is obtained. For every two samples in the difference sample set, the normalized size of their intersection is calculated, and the average of all the normalized sizes is calculated to get the stability $ST(X_i)$ at which the interpreter E generates the difference sample set from individual input samples.

The stability of the interpreter with respect to the whole difference sample set is represented as ST(E), which is calculated using the following equation:

$$ST(E) = \frac{1}{N} \sum_{i=0}^{N} ST(X_i)$$

where the value is the average stability for generating the difference sample set with respect to every individual input sample. The greater ST(E) is, the more stable the interpreter in the data set is.

According to the loss function, the similarity is such obtained that the features obtained in the step (1.2) and the step (1.3) that have relatively great importance scores are identified first, so as to obtain two sets of important features, and the original sample is input into the interpreter to output a set of important features, then the intersection of these three sets of important features is found and the number of elements in the intersections is counted, which are then averaged to produce the similarity value of the present iteration of training, expressed as the following equation:

$$SM(E) = \frac{1}{N} \sum_{x_i \in X_i} \text{card } (E(x_i) \cap E_1(x_i) \cap E_2(x_i))$$

where $E(x_i)$ denotes the important feature extracted from the code sample $x_i$ by the interpreter E, $E_1(X)$ denotes the important feature of the code sample $x_i$ having the relatively high score determined by using feature deletion to calculate the feature importance scores, and $E_2(x_i)$ denotes the important feature of the code sample $x_i$ having the relatively high score determined by using snippet formation to calculate the feature importance scores.

As a preferred implementation, the step (2) specifically comprises the following steps:

(2.1) extracting the important features from the object code samples: inputting the vectors of the object code samples into the trained interpreter in the step (1.4) to acquire a feature importance score vector, and extracting features with relatively high importance scores, so as to obtain the important features of the object code samples;

(2.2) identifying the training samples that are most contributive to prediction for the object code samples: calculating an effect of removal of each of the training samples on loss of prediction according to the influence function, thereby identifying the training samples that are most contributive to prediction for the object code samples; and (2.3) integrating the important features and the training sample to generate the interpretation result. By integrating the important features obtained in the step (2.1) and the training samples contributing most to prediction of the object code samples as identified in the step (2.2), a visualizable interpretation result can be generated.

Figure 5:
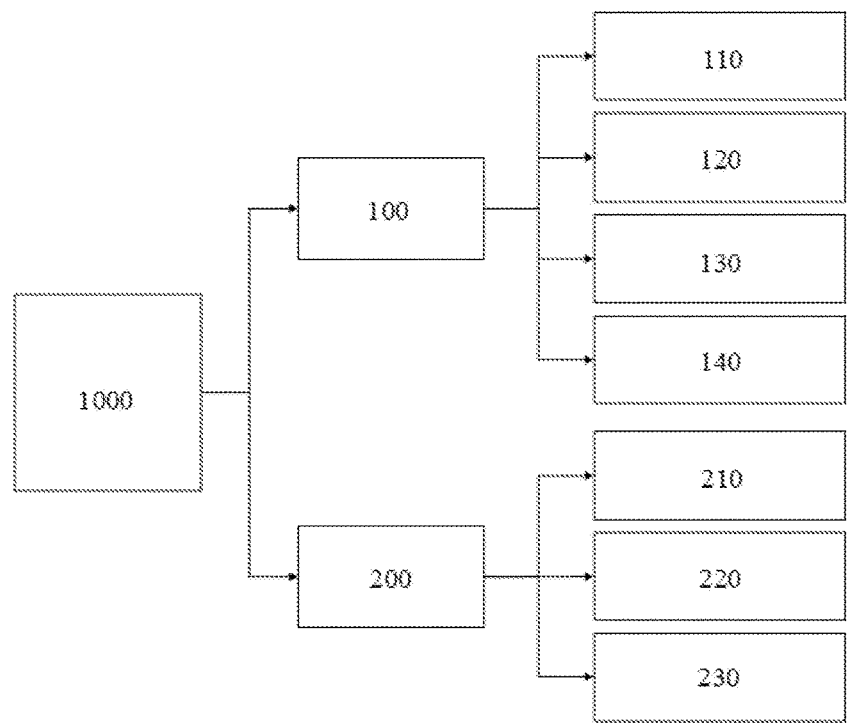
FIG. 5 is a block diagram partially showing the structure of a sample-difference-based system for interpreting a deep-learning model for code classification according to an embodiment of the present disclosure.

FIG. 5 is a block diagram partially showing the structure of a sample-difference-based system 1000 for interpretation of a deep-learning model for code classification, which mainly shows the composition of a processor, wherein the processor has the following modules:

an off-line training module 100, used for: constructing code transformation for every code sample in a training set to generate difference samples; generating difference samples through feature deletion and then calculating feature importance scores; generating difference samples through extracting code snippets and then calculating feature importance scores; and inputting the original code samples, the difference samples and the feature importance scores into a neural network for training the interpreter, so as to get a trained interpreter; and an on-line interpretation module 200, used for: using the trained interpreter to extract important features from snippets of the object code samples, then using an influence-function-based method to identify training samples in the training set that are most contributive to prediction for the individual tested samples, comparing the obtained important features and the most contributive training samples, and at last generating interpretation results for the object samples.

Further, the off-line training module comprises:

a code transformation and difference generation sub-module 110, constructing code transformation for training samples to generate difference samples, performing code transformation without changing any tag for each of the training samples, screening the generated difference samples, deleting the samples whose prediction types have been changed, and generating a code transformation difference sample set;

a feature deletion and score generation sub-module 120, used for: by means of deleting the features from the code samples in the training set, observing variation in the prediction value caused by the deletion, so as to acquire the importance scores of the features;

a snippet extraction and score generation sub-module 130, used for: by means of forming snippets of the code samples in the training set, observing differences among the prediction values of different snippets, so as to acquire the importance scores of the features; and a model training sub-module 140, used for: inputting the code samples from the training set, the difference samples, the feature importance scores and tags of the code samples from the training set into a neural network model for training, adjusting various parameters to acquire the trained interpreter, thereby extracting the important features from the code samples.

Further, the on-line interpretation module 200 comprises:

an important-feature extracting sub-module 210, for transforming the object code samples into the vector as required by the model to be interpreted and inputting the vectors into the trained interpreter to acquire the feature importance scores, and extracting the features having the relatively high importance scores so as to acquire the important features of the object code samples;

a training-sample identifying sub-module 220, for calculating the influence function, figuring out an effect of removal of each of the training samples on loss of prediction for the object code samples, identifying the training sample having the greatest effect on the prediction for the object code samples according to the influence function; and a result generating sub-module 230, for integrating the important features extracted from the object code samples and the most contributive training samples to generate the interpretation result that is visualizable, thereby enhancing understandability of the interpretation result.

After the foregoing processing, the server transmits the processed data to a storage array of independent disks, such as SSDs or HDDs, so that the trained interpreter, the text sequences of source codes and their corresponding important features as well as the training sample that contributes most to the prediction are stored y means of a MYSQL database management system.

Preferably, after processing, the trained interpreter is stored in the database in the format of hierarchical data, for data recombination and data management. The text sequences of source codes, and their corresponding important features as well as the training sample that contributes most to the prediction are stored in the database as key-value pairs, and are transmitted to the code classification deep-learning model interpretation system through the API interface for the prediction analysis services to use.

Further, based on one or more of the foregoing configurations, services like analysis of reasons for classification of source codes and analysis of errors in code classification deep-learning models can be realized, and eventually applied to transformation of technical achievements and application demonstration of code classification deep-learning model interpretation systems, thereby providing comprehensive model analysis services for governmental entities, enterprises, or individuals.

According to a preferred implementation, the present application further discloses a computer-readable storage medium, which stores computer instruction that realizes the step of off-line training an interpreter or the step of on-line interpreting the code samples as described previously when executed by the processor.

Preferably, the foregoing is an illustrative scheme of the computer-readable storage medium of the present implementation. It is to be noted that the technical scheme of the storage medium and the technical scheme of the step of off-line training an interpreter or the step of on-line interpreting the code samples are stem from the same conception and the technical scheme of the storage medium may be realized using any of the configurations in the art known by the inventor(s).

According to a preferred implementation, the present application further discloses a chip, which stores computer instructions which realizes the step of off-line training an interpreter or the step of on-line interpreting the code samples as described previously when executed by the processor.

According to a preferred implementation, the present application discloses a classification model training device, which at least comprises an off-line training module 100 that performs the step of off-line training an interpreter as described previously.

According to a preferred implementation, the present application may disclose an object-code-receiving device, which at least comprises an on-line interpretation module 200 that performs the step of on-line interpreting the code samples as described previously.

The computer instructions include computer program codes. The computer program codes may be in the form of source codes, object codes, executable files, or some intermediate forms. The computer-readable medium may include: any entity or device capable of carrying the computer program codes, a recording medium, a flash memory disk, a mobile hard disk, a magnetic disk, an optical disk, a computer memory, a read-only memory (ROM), a random access memory (RAM), an electric carrier signal, a telecommunication signal, and a software distribution medium. It is to be noted that, the definition of the computer-readable medium may vary depending on requirements for legislation and patent practice in different jurisdictions. For example, in some jurisdictions, electric carrier signals and telecommunication signals are not computer-readable media according to legislation and patent practice.

It is to be noted that the particular embodiments described previously are exemplary. People skilled in the art, with inspiration from the disclosure of the present disclosure, would be able to devise various solutions, and all these solutions shall be regarded as a part of the disclosure and protected by the present disclosure. Further, people skilled in the art would appreciate that the descriptions and accompanying drawings provided herein are illustrative and form no limitation to any of the appended claims. The scope of the present disclosure is defined by the appended claims and equivalents thereof. The disclosure provided herein contains various inventive concepts, such of those described in sections led by terms or phrases like "preferably", "according to one preferred mode" or "optionally". Each of the inventive concepts represents an independent conception and the applicant reserves the right to file one or more divisional applications therefor. Throughout the disclosure, any feature following the term "preferably" is optional but not necessary, and the applicant of the present application reserves the rights to withdraw or delete any of the preferred features any time.

What is claimed is:

1. A sample-difference-based method for interpreting a deep-learning model for code classification, the method comprising:
    off-line training an interpreter comprising:
    constructing code transformation for every code sample in a training set to generate difference samples; generating the difference samples through feature deletion and inputting samples before and after the feature deletion into the model to be interpreted to acquire prediction confidence levels corresponding to tags in the training set, calculating a difference between the prediction confidence levels of two samples as feature importance scores; generating the difference samples through extracting code snippets and inputting the code snippet made using a feature immediately before a feature to be calculated as its snipping point and the code snippet made using the feature to be calculated as its snipping point into the model to be interpreted to acquire the prediction confidence levels corresponding to the tags, calculating the difference between the prediction confidence levels of two samples as the feature importance scores; and inputting the original samples, the difference samples and the feature importance scores into a neural network, constructing a deep neural network framework for the interpreter and two approximators, defining a loss function, then fixing the two approximators and training the interpreter, then fixing the interpreter and training the two approximators, and circularly iterating the training until loss convergence, so as to eventually obtain a trained interpreter; and
    on-line interpreting the code samples comprising:
    using the trained interpreter to extract important features from snippets of object code samples, then using an influence-function-based method to calculate an effect of removing a training sample in the training set on loss of prediction sample, so as to identify training samples in the training set that are most contributive to prediction for the training sample, comparing the extracted important features and the most contributive training samples, and generating interpretation results for the object code samples,
    wherein the constructing code transformation to generate the difference samples comprises:
    for the input code samples, scanning all code transformation points that meet transformation requirements, generating a plurality of transformation vectors of corresponding dimensions, conducting the code transformation with the generated transformation vectors, screening the generated difference samples, and deleting the samples that do not meet expectations so as to get a difference sample set.

2. The method of claim 1, wherein the off-line training the interpreter comprises:
    deleting the features and calculating the feature importance scores:
    deleting each feature in the code samples individually, to generate the difference samples, so that a number of the generated difference samples is equal to a number of the features; inputting the difference samples into the model to be interpreted for prediction, and generating the feature importance scores of the corresponding features according to variation in prediction values caused by deletion of the features.

3. The method of claim 1, wherein the off-line training the interpreter comprises:
    forming the snippets and calculating the feature importance scores:
    for the code samples, defining each of the features as a snipping point, and extracting the features between a first feature of the sample and the snipping point, so as to get the code snippets, tail-padding each of the code snippets with zeros to generate the vectors of an identical length, inputting the vectors into the model to be interpreted for the prediction, generating the feature importance scores of the corresponding features according to variation in prediction values caused by movement of the snipping points.

4. The method of claim 1, wherein the framework of the interpreter and two approximators is designed such that the approximators have a structure that is identical to a structure of the original model to be interpreted, and that the interpreter has a model structure determined by format of input data, wherein if the data are input as sequences, the interpreter is designed as a Recurrent Neural Network; or if the data are input as abstract syntax trees (ASTs), the interpreter is designed as an AST-based Convolutional Neural Network.

5. The method of claim 1, wherein the on-line interpreting the code samples comprises:
    extracting the important features from the object code samples:
    inputting the vectors of the object code samples into the trained interpreter to acquire a feature importance score vector, and extracting features with relatively high feature importance scores, so as to obtain the important features of the object code samples;
    identifying the training samples that are most contributive to prediction for the object code samples; and
    integrating the important features and the training samples to generate the interpretation result, wherein the interpretation result is visualizable.

6. A sample-difference-based system for interpreting a deep-learning model for code classification, the system comprising a processor that comprises:
    an off-line training module, configured for:

constructing code transformation for every code sample in a training set to generate difference samples; generating the difference samples through feature deletion and inputting samples before and after the feature deletion into the model to be interpreted to acquire prediction confidence levels corresponding to tags in the training set, calculating a difference between the prediction confidence levels of two samples as feature importance scores; generating the difference samples through extracting code snippets and inputting the code snippet made using a feature immediately before a feature to be calculated as its snipping point and the code snippet made using the feature to be calculated as its snipping point into the model to be interpreted to acquire the prediction confidence levels corresponding to the tags, calculating the difference between the prediction confidence levels of two samples as the feature importance scores; and inputting the original samples, the difference samples and the feature importance scores into a neural network, constructing a deep neural network framework for the interpreter and two approximators, defining a loss function, then fixing the two approximators and training the interpreter, then fixing the interpreter and training the two approximators, and circularly iterating the training until loss convergence, so as to eventually obtain a trained interpreter; and an on-line interpretation module, configured for:

using the trained interpreter to extract important features from object code samples, then using an influence-function-based method to calculate an effect of removing a training sample in the training set on loss of prediction sample, so as to identify training samples in the training set that are most contributive to prediction for the training sample, comparing the extracted important features and the most contributive training samples, and generating interpretation results for the object code samples, the off-line training module is configured to process the input code samples by scanning all code transformation points that meet transformation requirements, generating a plurality of transformation vectors of corresponding dimensions, conducting the code transformation with the generated transformation vectors, screening the generated difference samples, and deleting the samples that do not meet expectations so as to get a difference sample set.

7. The system of claim 6, wherein the off-line training module comprises:

a code transformation and difference generation sub-module, configured for:

constructing code transformation for training samples to generate difference samples, performing code transformation without changing any tag for each of the training samples, screening the generated difference samples, deleting the samples whose prediction types have been changed, and generating a code transformation difference sample set;

a feature deletion and score generation sub-module, configured for:

deleting the features from the code samples in the training set, observing variation in the prediction values caused by the deletion, so as to acquire the feature importance scores of the features;

a snippet extraction and score generation sub-module, configured for:

forming snippets of the code samples in the training set, observing differences among the prediction values of different snippets, so as to acquire the feature importance scores of the features; and a model training sub-module, configured for:

inputting the code samples from the training set, the difference samples, the feature importance scores and tags of the code samples from the training set into a neural network model for training, adjusting various parameters to acquire the trained interpreter, thereby extracting the important features from the code samples.

8. The system of claim 6, wherein the on-line interpretation module comprises:

an important-feature extracting sub-module, configured for:

transforming the object code samples into the vector as required by the model to be interpreted and inputting the vectors into the trained interpreter to acquire the feature importance scores, and extracting the features having relatively high feature importance scores so as to acquire the important features of the object code samples;

a training-sample identifying sub-module, for calculating the influence function, figuring out an effect of removal of each of the training samples on loss of prediction for the object code samples, identifying the training samples having the greatest effect on the prediction for the object a code samples according to the influence function; and result generating sub-module, configured for:

integrating the important features extracted from the object code samples and the most contributive training samples to generate the interpretation result that is visualizable, thereby enhancing understandability of the interpretation result.

* * * * *